(12) United States Patent
Vanheusden et al.

(10) Patent No.: US 11,735,745 B2
(45) Date of Patent: Aug. 22, 2023

(54) LITHIUM-AIR BATTERY

(71) Applicant: Lyten, Inc., San Jose, CA (US)

(72) Inventors: Karel Vanheusden, Woodside, CA (US); Ratnakumar Bugga, Arcadia, CA (US); Daniel Cook, Woodside, CA (US)

(73) Assignee: Lyten, Inc., San Jose, CA (US)

( * ) Notice: Subject to any disclaimer, the term of this patent is extended or adjusted under 35 U.S.C. 154(b) by 17 days.

(21) Appl. No.: 17/485,888

(22) Filed: Sep. 27, 2021

(65) Prior Publication Data

US 2022/0407085 A1 Dec. 22, 2022

Related U.S. Application Data

(60) Provisional application No. 63/211,445, filed on Jun. 16, 2021.

(51) Int. Cl.
*H01M 4/86* (2006.01)
*H01M 12/08* (2006.01)
(Continued)

(52) U.S. Cl.
CPC ........ *H01M 4/8626* (2013.01); *H01M 4/134* (2013.01); *H01M 4/366* (2013.01);
(Continued)

(58) Field of Classification Search
CPC .... H01M 4/8626; H01M 4/134; H01M 4/366; H01M 4/382; H01M 4/628; H01M 4/9083; H01M 12/08
See application file for complete search history.

(56) References Cited

U.S. PATENT DOCUMENTS

| | | | |
|---|---|---|---|
| 4,701,317 A | 10/1987 | Arakawa et al. | |
| 5,436,093 A | 7/1995 | Huang et al. | |
| | (Continued) | | |

FOREIGN PATENT DOCUMENTS

| | | |
|---|---|---|
| CA | 2032137 A | 11/1990 |
| CN | 101997120 A | 3/2011 |
| | (Continued) | |

OTHER PUBLICATIONS

An, K. et al.; "Electrochemical Properties of High-Power Supercapacitors Using Single-Walled Carbon Nanotube Electrodes"; Advanced Functional Materials; vol. 11, Issue 5; Oct. 2, 2001.
(Continued)

*Primary Examiner* — Stewart A Fraser
(74) *Attorney, Agent, or Firm* — Paradice & Li LLP

(57) ABSTRACT

A battery may include an anode, a cathode positioned opposite to the anode, a separator positioned between the anode and the cathode, an electrolyte dispersed throughout the cathode and in contact with the anode, and a dual-pore system. The anode may be configured to release a plurality of lithium ions. The cathode may include a plurality of pathways defined by a plurality of porous non-hollow carbonaceous spherical particles and may include a plurality of carbonaceous structures each based on a coalescence of a group of the porous non-hollow carbonaceous spherical particles. The dual-pore system may be disposed in the cathode and defined in shape and orientation by the plurality of carbonaceous structures. In some aspects, the dual-pore system may be configured to receive gaseous oxygen from the ambient atmosphere.

19 Claims, 8 Drawing Sheets

(51) Int. Cl.
*H01M 4/36* (2006.01)
*H01M 4/134* (2010.01)
*H01M 4/62* (2006.01)
*H01M 4/90* (2006.01)
*H01M 4/38* (2006.01)
*H01M 4/02* (2006.01)

(52) U.S. Cl.
CPC ........... H01M 4/382 (2013.01); H01M 4/628 (2013.01); H01M 4/9083 (2013.01); H01M 12/08 (2013.01); *H01M 2004/027* (2013.01); *H01M 2004/8689* (2013.01)

(56) References Cited

U.S. PATENT DOCUMENTS

| | | | |
|---|---|---|---|
| 5,595,837 | A | 1/1997 | Olsen et al. |
| 6,060,184 | A | 5/2000 | Gan et al. |
| 6,136,477 | A | 10/2000 | Gan et al. |
| 6,210,839 | B1 | 4/2001 | Gan et al. |
| 6,599,492 | B2 | 7/2003 | Iwamura et al. |
| 6,757,154 | B2 | 6/2004 | Reynolds, III et al. |
| 7,206,189 | B2 | 4/2007 | Reynolds, III |
| 7,465,519 | B2 | 12/2008 | Tang et al. |
| 7,623,340 | B1 | 11/2009 | Song et al. |
| 7,745,047 | B2 | 6/2010 | Zhamu et al. |
| 7,790,243 | B2 | 9/2010 | Radhakrishnan et al. |
| 7,875,219 | B2 | 1/2011 | Zhamu et al. |
| 8,114,375 | B2 | 2/2012 | Jang et al. |
| 8,119,288 | B2 | 2/2012 | Zhamu et al. |
| 8,241,793 | B2 | 8/2012 | Zhamu et al. |
| 8,497,225 | B2 | 7/2013 | Zhamu et al. |
| 8,936,870 | B2 | 1/2015 | Affinito et al. |
| 8,940,145 | B1 | 1/2015 | Chen et al. |
| 8,968,924 | B2 | 3/2015 | Bosnyak et al. |
| 9,005,809 | B2 | 4/2015 | Wilkening et al. |
| 9,034,421 | B2 | 5/2015 | Mikhaylik et al. |
| 9,099,744 | B2 | 8/2015 | Janssen et al. |
| 9,171,679 | B2 | 10/2015 | Gogotsi et al. |
| 9,190,667 | B2 | 11/2015 | Zhamu et al. |
| 9,190,694 | B2 | 11/2015 | Lopez et al. |
| 9,419,274 | B2 | 8/2016 | Wilkening et al. |
| 9,437,344 | B2 | 9/2016 | Zhamu et al. |
| 9,576,694 | B2 | 2/2017 | Gogotsi et al. |
| 9,577,243 | B2 | 2/2017 | Schmidt et al. |
| 9,666,899 | B2 | 5/2017 | He et al. |
| 9,742,030 | B2 | 8/2017 | Wright et al. |
| 10,083,801 | B2 | 9/2018 | Zhamu et al. |
| 10,734,653 | B2 | 8/2020 | Lanning et al. |
| 10,862,129 | B2 | 12/2020 | Pan et al. |
| 10,998,552 | B2 | 5/2021 | Lanning et al. |
| 2003/0086859 | A1 | 5/2003 | Kawakami et al. |
| 2009/0022649 | A1 | 1/2009 | Zhamu et al. |
| 2009/0028777 | A1 | 1/2009 | Zhamu et al. |
| 2009/0038681 | A1* | 2/2009 | Trancik ............... H01G 9/0022 977/750 |
| 2009/0117467 | A1 | 5/2009 | Zhamu et al. |
| 2009/0220767 | A1 | 9/2009 | Schlogl et al. |
| 2010/0056819 | A1 | 3/2010 | Jang et al. |
| 2011/0091773 | A1 | 4/2011 | Wei |
| 2012/0058397 | A1 | 3/2012 | Zhamu et al. |
| 2012/0088154 | A1 | 4/2012 | Liu et al. |
| 2012/0094175 | A1 | 4/2012 | Sheem et al. |
| 2012/0251886 | A1 | 10/2012 | Yushin et al. |
| 2013/0065034 | A1 | 3/2013 | Muramatsu |
| 2013/0115527 | A1 | 5/2013 | Au |
| 2014/0057179 | A1 | 2/2014 | Yushin et al. |
| 2014/0313636 | A1 | 10/2014 | Tour et al. |
| 2015/0044565 | A1 | 2/2015 | Wang et al. |
| 2015/0179294 | A1 | 6/2015 | Kim et al. |
| 2016/0027934 | A1 | 1/2016 | Noyes |
| 2016/0043384 | A1 | 2/2016 | Zhamu et al. |
| 2016/0049666 | A1* | 2/2016 | Ball ..................... C01B 32/336 429/405 |
| 2016/0093916 | A1 | 3/2016 | Moon et al. |
| 2016/0248084 | A1 | 8/2016 | Cairns et al. |
| 2016/0285110 | A1 | 9/2016 | Sun et al. |
| 2016/0294000 | A1 | 10/2016 | He et al. |
| 2017/0092950 | A1 | 3/2017 | Xiao et al. |
| 2017/0207484 | A1 | 7/2017 | Zhamu et al. |
| 2018/0301693 | A1* | 10/2018 | Choi .................... H01M 4/134 |
| 2019/0108948 | A1 | 4/2019 | Chai et al. |
| 2020/0052325 | A1 | 2/2020 | Zhamu et al. |
| 2020/0123008 | A1 | 4/2020 | Guo et al. |
| 2020/0235392 | A1 | 7/2020 | Jang |
| 2020/0278316 | A1 | 9/2020 | Lanning et al. |
| 2021/0036312 | A1* | 2/2021 | Lanning ............... H01M 4/622 |
| 2021/0057751 | A1 | 2/2021 | Lanning et al. |
| 2021/0303631 | A1 | 2/2021 | Lanning et al. |
| 2021/0126258 | A1 | 4/2021 | Bell et al. |
| 2021/0126286 | A1 | 4/2021 | Rogojina et al. |
| 2021/0126287 | A1 | 4/2021 | Rogojina et al. |
| 2021/0359299 | A1* | 11/2021 | Kim ..................... H01M 4/382 |

FOREIGN PATENT DOCUMENTS

| | | |
|---|---|---|
| CN | 102903896 A | 1/2013 |
| CN | 108155350 A | 6/2018 |
| CN | 109314225 A | 2/2019 |
| CN | 109786698 A | 5/2019 |
| CN | 112838194 A | 5/2021 |
| EP | 2744751 A2 | 6/2014 |
| JP | 2010095390 A | 4/2010 |
| JP | 2016532566 A | 10/2016 |
| JP | 2020194792 A | 12/2020 |
| KR | 100572638 B1 | 4/2006 |
| WO | 2012/039533 A1 | 3/2012 |
| WO | 2014/048390 A1 | 4/2014 |
| WO | 2015/058057 A1 | 4/2015 |
| WO | 2015/084945 A1 | 6/2015 |
| WO | 2016/061216 A1 | 4/2016 |
| WO | 2016/135328 A1 | 9/2016 |
| WO | 2016/201101 A1 | 12/2016 |
| WO | 2017/127674 A1 | 7/2017 |
| WO | 2018/122368 A1 | 7/2018 |
| WO | 2019/019412 A1 | 1/2019 |
| WO | 2021/247596 A1 | 12/2021 |

OTHER PUBLICATIONS

Bartelmess et al., "Carbon nano-onions (multi-layer fullerenes): chemistry and applications", Beilstein Journal of Nanotechnology, Nov. 4, 2014 (Published online), vol. 5, pp. 1980-1998.
Beguin et al., Carbons and Electrolytes for Advanced Supercapacitors. Adv. Mater., Feb. 26, 2014, pp. 2219-2251.
Berger; "Carbon-nanotube paper electrodes with very high loading for lithium-sulfur batteries", Nanowerk, 7 pages; Oct. 17, 2014.
Choudhury et al.; "Carbon onion-sulfur hybrid cathodes for lithium-sulfur batteries", Sustainable Energy Fuels; vol. 1; pp. 84-94; Jan. 2017.
Final Report Summary—LISSEN (Lithium Sulfur Superbattery Exploitating Nanotechnology), CORDIS, Record No. 181634; dated Apr. 4, 2016.
Fu, J., et al., "Flexible High-Energy Polymer-Electrolyte-Based Rechargeable Zinc-Air Batteries", Advanced Materials; 27(37); pp. 5617-5622; Oct. 2015.
Gao et al., Chemical activation of carbon nano-onions for high-rate supercapacitor electrodes, Carbon, vol. 51, Jan. 2013, pp. 52-58.
Guo, B., et al., "Hierarchical N-Doped Porous Carbons for Zn-Air Batteries and Supercapacitors", Nano-Micro Letters; 12(1); p. 20; Jan. 1, 2020.
Han et al., "E-beam direct synthesis of macroscopic thick 3D porous graphene films", Carbon; vol. 182; Jun. 10, 2021; pp. 393-403.
He, G. et al.; "High "C" rate Li—S cathodes: sulfur imbibed bimodal porous carbons"; Energy & Environmental Science; vol. 4; pp. 2878-2883; Apr. 2011.
International Search Report and Written Opinion dated May 28, 2018 for PCT Patent Application Serial No. PCT/US2018/019772.
International Search Report and Written Opinion dated Aug. 7, 2019, for PCT Patent Application Serial No. PCT/US2019/029445; 10 pages.

(56) References Cited

OTHER PUBLICATIONS

International Search Report and Written Opinion dated Nov. 13, 2020, for PCT Patent Application Serial No. PCT/US2020/044488; 16 pages.
International Search Report and Written Opinion dated Jan. 20, 2022, for PCT Application Serial No. PCT/US2021/049478; 13 pages.
Jackel et al., Comparison of carbon onions and carbon blacks as conductive additives for carbon supercapacitors in organic electrolytes, Journal of Power Sources, vol. 272, Dec. 25, 2014, pp. 1122-1133.
Ji et al.; "A highly ordered nanostructured carbon-sulphur cathode for lithium-sulphur batteries", Nature Materials, vol. 8, May 2009, pp. 500-506.
Ji, K. et al.; "Lithium intercalation into bilayer graphene"; Nature Communications; 19(1); pp. 1-10; Jan. 17, 2019.
Kang, H. et al., "Thirty-minute synthesis of hierarchically ordered sulfur particles enables high-energy, flexible lithium-sulfur batteries", Nano Energy, vol. 89; Aug. 25, 2021; 10 pages.
Kim, J. et al., "Improved Cycling Performance of Lithium-Oxygen Cells by Use of a Lithium Electrode Protected with Conductive Polymer and Aluminum Fluoride", ACS Applied Materials & Interfaces; vol. 8; Nov. 9, 2016; pp. 32300-32306.
Kim, P. et al., "Towards Highly Stable Lithium Sulfur Batteries: Surface Functionalization of Carbon Nanotube Scaffold", Purdue University, West Lafayette, IN; 2018; 25 pages.
Krause et al., "High Area Capacity Lithium-Sulfur Full-cell Battery with Prelithiated Silicon Nanowire-Carbon Anodes for Long Cycling Stability", Scientific Reports, vol. 6, No. 27982; 12 pages; Jun. 20, 2016.
Lee, E. et al.; "Li Absorption and Intercalation in Single Layer Graphene and Few Layer Graphene by First Principles" NANO Letters; 12(9), pp. 4624-4628; Sep. 12, 2012.
Lee, Y. et al., "High-Energy Long-Cycling All-Solid-State Lithium Metal Batteries Enabled by Silver-Carbon Composite Anodes", Nature Energy; 5(4); pp. 299-308; Apr. 2020.
Liu, R. et al., "Mass Production of 3D Connective Graphene Networks by Fluidized Bed Chemical Vapor Deposition and Its Application in High Performance Lithium-Sulfur Battery", Nanomaterials; vol. 12, No. 150; Dec. 31, 2021; 13 pages.
Lu, Z. et al.; "Improving Li anode performance by a porous 3D carbon paper host with plasma assisted sponge carbon coating"; Energy Storage Materials; vol. 11; pp. 47-56; 2018.
Ma, L. et al., "Enhanced Li—S Batteries using Amine-Functionalized Carbon Nanotubes in the Cathode", ACS Nano 2016; vol. 10, Dec. 4, 2015; pp. 1050-1059.
Maihom, T. et al., "Lithium Bond Impact on Lithium Polysulfide Adsorption with Functionalized Carbon Fiber Paper Interlayers for Lithium-Sulfur Batteries", J. Phys. Chem. C, vol. 122; Mar. 15, 2018; pp. 7033-7040.
Mishra, A., et al., "Electrode materials for lithium-ion batteries", Materials Science for Energy Technologies; 1(2); pp. 182-187; Dec. 1, 2018.
Pappas et al., "Heteroatom doped-carbon nanospheres as anodes in lithium ion batteries", Materials, Jan. 9, 2016 (Published online), vol. 9, No. 35, pp. 1-13.
Pech et al., Ultrahigh-power micrometre-sized supercapacitors based on onion-like carbon, Nature Nanotechnology, vol. 5, Aug. 15, 2010, pp. 651-654.
Plonska-Brzezinska and Echegoyen, Carbon nano-onions for supercapacitor electrodes: recent developments and applications, Journal of Materials Chemistry A, Issue 44, Nov. 2013, 11 pages.
Portet et al., Electrochemical performance of carbon onions, nanodiamonds, carbon black and multiwalled nanotubes in electrical double layer capacitors, Carbon, vol. 45, Issue 13, Nov. 2007, pp. 2511-2518.
"Pyrolytic Carbon", Biomedical Engineering Desk Reference, Oxford, UK; Elsevier, pp. iii-vi and 267; 2009.
Rodrigues, M. et al., "A materials perspective on Li-ion batteries at extreme temperatures", Nature Energy; 2(8); pp. 1-4; Jul. 24, 2017.
Schuster et al., "Spherical Ordered Mesoporous Carbon Nanoparticles with High Porosity for Lithium-Sulfur Batteries", Angew. Chem. Int. Ed., 51, Mar. 2012, pp. 3591-3595.
Shaibani, M., et al., "Expansion-tolerant architectures for stable cycling of ultrahigh-loading sulfur cathodes in lithium-sulfur batteries", Science Advances; 6(eaay2757); 11 pages; Jan. 3, 2020.
Si et al., Carbon paper substrate for silicone-carbon composite anodes in lithium-ion batteries, Journal of Power Sources, vol. 241, Nov. 2013, pp. 744-750.
Son, I. et al., "Graphene balls for lithium rechargeable batteries with fast charging and high volumetric energy tensities", Nature Communications; 8(1); pp. 1-11; Nov. 16, 2017.
Takamura, T., et al.; "A key technology to improve the cyclic performances of carbonaceous materials for lithium secondary battery anodes" Science Direst Journal of Power Sources vol. 68, Issue 1, Sep. 1997, pp. 114-119.
Velez, P. et al., "On the role of oxidized graphene interfaces in lithium sulfur batteries: Thermodynamic and kinetic aspects using density functional theory", Applied Surface Science, vol. 550 (149358); Feb. 22, 2021; 14 pages.
Wang, H. et al., "Graphene-Wrapped sulfur particles as a rechargeable lithium-sulfur battery cathode material with high capacity and cycling stability", Nano Letters; 11(7); pp. 2644-2647; Jul. 13, 2011.
Wang, J., et al., Sulfur-mesoporous carbon composites in conjunction with a novel ionic liquid electrolyte for lithium rechargeable batteries, Carbon, vol. 46, Issue 2, Feb. 2008, pp. 229-235.
Yamada et al., Concentric shell carbon: curling process of graphitic layers, Carbon, vol. 35, Issue 12, Oct. 1997, pp. 1844-1846.
Yamada, Shock synthesis of concentric shell fullerene dimers and trimers, Carbon, 42, Jun. 2004, pp. 3003-3042.
Yan et al., High-Performance Lithium-Sulfur Batteries with a Cost-Effective Carbon Paper Electrode and High Sulfur-Loading, Chemistry of Materials, 27 (18), Aug. 2015, pp. 6394-6401.
Zeng, F. et al., "Enhanced Li—S batteries using cation-functionalized pigment nanocarbon in core-shell structured composite cathodes", J. Mater. Chem. A, vol. 5, 2017; pp. 5559-5567.
Zhang, L., et al., Graphene-based materials as supercapacitor electrodes, Journal of Materials Chemistry, Issue 29, Aug. 2010, pp. 5983-5992.
Zhang, J., et al., "3D-printed functional electrodes towards Zn-Air batteries", Materials Today Energy; 16; p. 100407; Jun. 1, 2020.
Zheng, M., et al.; "Activated graphene with tailored pore structure parameters for long cycle-life lithium-sulfur batteries" Nano Res.; 10(12); pp. 4305-4317; 2017.
International Search Report and Written Opinion dated Dec. 8, 2022, for PCT Appl. No. PCT/US2022/033890; 13 pages.
Sun, B. et al., "Graphene nanosheets as cathode catalysts for lithium-air batteries with an enhanced electrochemical performance", Carbon; vol. 50, No. 2; Sep. 19, 2011; pp. 727-733.
International Search Report and Written Opinion dated Mar. 14, 2023, for PCT Appl. No. PCT/US2022/037905; 17 pages.

* cited by examiner

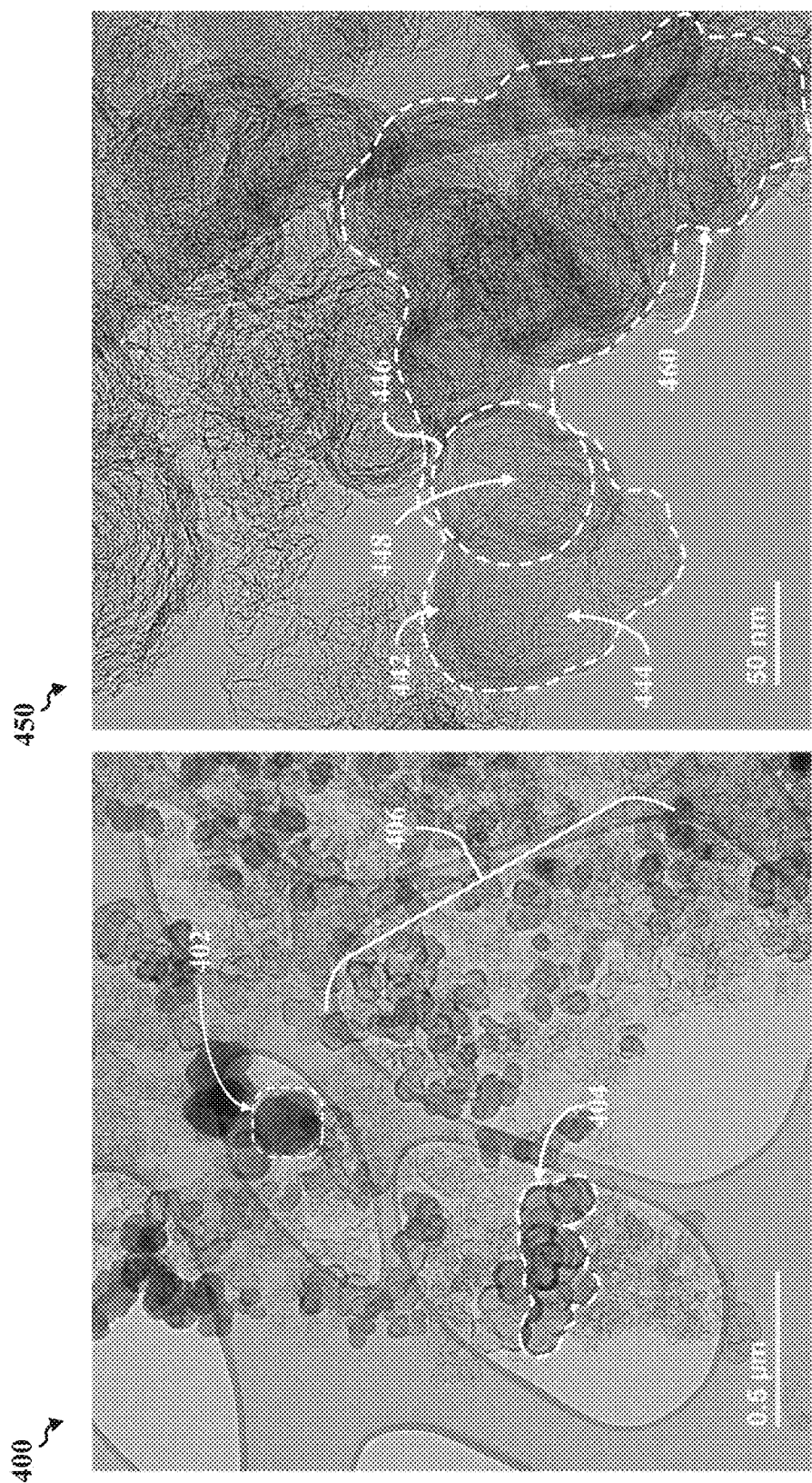

LITHIUM-AIR BATTERY

CROSS-REFERENCE TO RELATED APPLICATIONS

This patent application claims priority to U.S. Provisional Patent Application No. 63/211,445 entitled "LITHIUM-AIR BATTERY" filed on Jun. 16, 2021, which is assigned to the assignee hereof. The disclosure of the prior application is considered part of and is incorporated by reference in this patent application in its entirety.

TECHNICAL FIELD

This disclosure relates generally to lithium-air batteries, and, more particularly, to a lithium-air battery having a cathode with porous pathways.

DESCRIPTION OF RELATED ART

Lithium-air batteries can be used to power a wide variety of loads ranging from portable communication devices to electric vehicles. Lithium-air batteries use oxygen as the cathode active material, for example, to oxidize lithium at the anode during battery discharge cycles and to reduce oxygen to lithium oxide at the cathode during battery discharge cycles and vice versa during battery charge cycles. By using oxygen supplied by ambient air as the cathode active material, lithium-air batteries do not need to store any cathode active material. Although lithium-air batteries have extremely high theoretical specific energy (e.g., over 11,000 Wh/kg), practical specific energy may be lower due to slow kinetics of electron transfer and/or incomplete utilization of the cathode porous geometry for redox reactions and accumulation of lithium oxides and other products in the cathode during operational cycling of the lithium-air battery can restrict the flow of oxygen into and throughout the cathode, which may degrade performance of the lithium-air battery. Therefore, further improvements in lithium-air batteries are desirable.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter described in this disclosure may be implemented as a lithium-air battery, which may be in fluid communication with ambient air in an external atmosphere. In some implementations, the lithium-air battery may include an anode, a cathode, and an electrolyte. The anode may release lithium (Li) ions upon activation of the lithium-air battery and during operational cycling of the lithium-ion battery. The cathode may be positioned opposite to the anode. The cathode may include pathways defined by porous non-hollow carbonaceous spherical particles and carbonaceous structures. Each carbonaceous structure may be formed by coalescence of a group of the porous non-hollow carbonaceous spherical particles. A dual-pore system may be disposed in the cathode and defined in shape and orientation by the carbonaceous structures. The dual-pore system may receive gaseous oxygen from the ambient atmosphere. An electrolyte may be dispersed throughout the cathode and in contact with the anode. A separator may be positioned between the anode and the cathode.

In one implementation, the dual-pore system may include a network of interconnected storage pores that may retain a reaction product precipitated during battery cycling and a network of interconnected transport pores that may transport oxygen from the ambient atmosphere into the cathode. The network of interconnected storage pores and the network of interconnected transport pores may be in fluid communication with each other. In this way, the network of interconnected storage pores may extract accumulations of the reaction product from the network of interconnected transport pores. In some aspects, at least some interconnected storage pores may have a diameter in an approximate range between 0.6 nanometers (nm) and 6.6 nm, such that a discharge capacity of the lithium-air battery is based at least in part on the diameter of a respective interconnected storage or transport pore. In addition, the interconnected transport pores may have an orifice open to the ambient atmosphere. In this way, the interconnected storage pores may retain the reaction product within a specified distance from a respective orifice.

In one implementation, a protective layer may be disposed on the anode. The protective layer may include a polymeric network and a lithium halide (e.g., LiF, LiBr and/or LiI) film. The polymeric network may be deposited over one or more exposed surfaces of the anode. The polymeric network may include the carbonaceous structures grafted with fluorinated polymer chains cross-linked with each other. The lithium halide (LiX) film may be formed from the polymeric network and lithium provided by the anode. In some aspects, an outer layer may be deposited on the lithium fluoride film, where the outer layer includes one or more of a polymer or an epoxy encapsulated ionic conductor. In addition, the anode may be a Li metal layer (e.g., a solid layer) that may be dispersed in a porous carbon structure or a Li alloy.

In some implementations, each carbonaceous structure may include graphene nanosheets, where each graphene nanosheet may have a principal dimension of less than 1 μm. Some of the graphene nanosheets may include mesopores, where each mesopore may have a volume approximately greater than 1 cc/g. In some aspects, the cathode has a surface area in an approximate range between 5 $m^2/g$ and 3,000 $m^2/g$ and may include graphene doped with one or more of nitrogen or sulfur. In addition, the cathode may be treated with ozone ($O_3$). The cathode may include a catalyst deposited on the surface to improve cathode-based reaction (e.g., oxygen reduction) kinetics. In some implementations, some pathways have a diameter approximately between 0.1 μm and 10 μm. In some aspects, the electrolyte may include an aprotic liquid-phase electrolyte solution.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

The drawings described below are for illustration purposes only. The drawings are not intended to limit the scope of the present disclosure.

FIGS. 4A and 4B show micrographs of various carbonaceous materials, according to some implementations.

Like reference numbers and designations in the various drawings indicate like elements.

DETAILED DESCRIPTION

Figure 1:
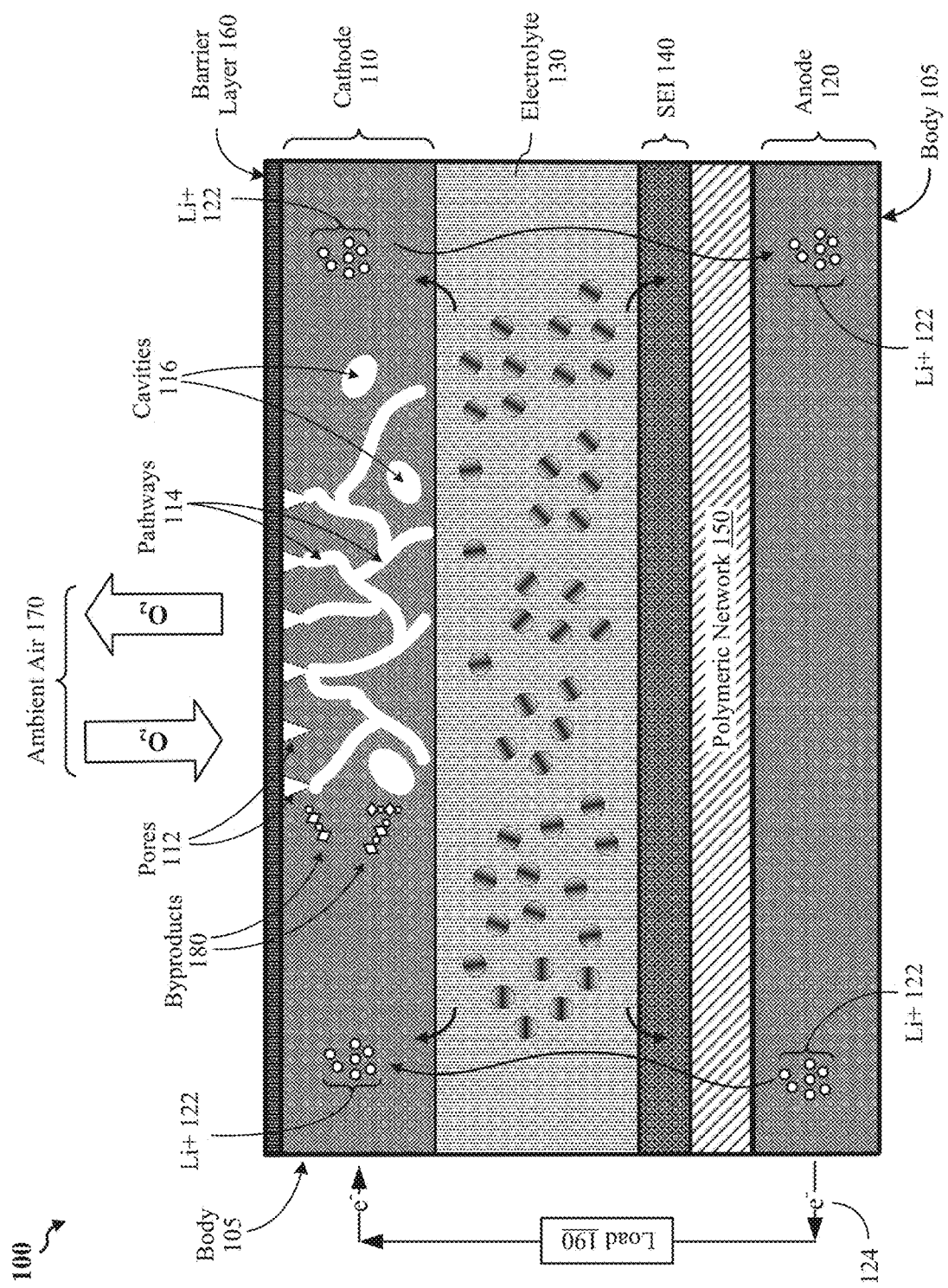
FIG. 1 shows a diagram depicting an example battery, according to some implementations.

The following description is directed to some example implementations for the purposes of describing innovative aspects of this disclosure. However, a person having ordinary skill in the art will readily recognize that the teachings herein can be applied in a multitude of different ways. The described implementations can be implemented in any type of electrochemical cell, battery, or battery pack, and can be used to compensate for various performance related deficiencies. As such, the disclosed implementations are not to be limited by the examples provided herein, but rather encompass all implementations contemplated by the attached claims. Additionally, well-known elements of the disclosure will not be described in detail or will be omitted so as not to obscure the relevant details of the disclosure.

As used herein, "porosity" refers to a ratio of the volume of pores or void space in a material to the geometric volume of the material. Porosity can be measured using suitable methods such as, but not limited to, BET method and gas permeability measurements. As used herein, the terms "about" and "approximately" are used to provide flexibility, such as to indicate, for example, that a given value in a numerical range endpoint may be "a little above" or "a little below" the endpoint. The degree of flexibility for a particular variable can be readily determined by one skilled in the art based on the context. As used herein with respect to an identified property or circumstance, "substantially" refers to a degree of deviation that is sufficiently small so as to not measurably detract from the identified property or circumstance. The exact degree of deviation allowable may in some cases depend on the specific context.

In addition, concentrations, amounts, and other numerical data may be presented herein in a range format. It is to be understood that such a range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 2.5 it is to be interpreted to include not only the explicitly recited limits of 1 to about 2.5, but also to include individual numerals such as 2, 3, 4, and sub-ranges such as 1 to 3, 2 to 4, etc. The same principle applies to ranges reciting only one numerical value, such as "less than about 2.5," which is to be interpreted to include all of the above-recited values and ranges. Further, such an interpretation should apply regardless of the breadth of the range or the characteristic being described.

Batteries typically include several electrochemical cells that can be connected in a series and/or parallel network to provide electric power to a wide variety of devices such as (but not limited to) mobile phones, laptops, electric vehicles (EVs), factories, and buildings. Electrolyte is a key component in electrochemical cells and all battery types, especially lithium-based batteries, which may be limited in performance by the type of electrolyte used or by uncontrolled battery side reactions. As a result, optimization of the electrolyte may improve the overall performance including cyclability, the specific discharge capacity, the discharge capacity retention, the safety, and the lifespan of a respective battery.

Lithium-air batteries use oxygen supplied by ambient air as the cathode active material, and lithium metal as the anode. Use of a porous cathode in a lithium-air battery allows gaseous oxygen supplied by ambient air to diffuse throughout the cathode and react with lithium ions during battery discharge reactions, and allows gaseous oxygen to return to the ambient air during battery charge processes. By using oxygen as the cathode active material, lithium-air batteries can provide greater energy storage capabilities than other types of batteries, either in a primary or rechargeable cell, due to the abundance of oxygen available at the cathode. In other words, by using oxygen as the cathode active material, lithium-air batteries do not need to store any cathode active materials, and therefore the specific energy and energy storage capabilities of lithium-air batteries are not limited by the amount of cathode active material that can be stored in the cathode.

Oxygen reduction, as associated with lithium air battery cycling, may occur at a three-phase boundary, such as where a solid (cathode), a liquid (electrolyte) and a gas (oxygen) contact each other. In the alternative, such a configuration provides an available pathway for lithium ion to travel and/or be transported through the liquid electrolyte, gaseous oxygen through porous pathways within the cathode, and electrons conducted in carbonaceous materials within cathode. In this way, highly porous cathode structures may be used in lithium-air batteries to increase the available electrochemical reaction areas, thereby resulting in increased electrical current conduction from that lithium air battery.

During successive discharge and charge cycles of a lithium-air battery, discharge products produced at the cathode can affect battery performance kinetically and degrade the specific energy, the energy capacity, and the lifespan of the battery. For example, chemical reactions between lithium ions and oxygen at the cathode can produce lithium dioxide ($Li_2O$) and lithium superoxide ($Li_2O_2$). Lithium dioxide and, in some instances, lithium superoxide, are insoluble in certain types of electrolytes used in lithium-air batteries, and therefore cannot diffuse away from the cathode through the electrolyte. Instead, these lithium oxide products may be trapped in the cathode and accumulate within various pores, especially at the pore entrance (e.g., pore "mouth") and pathways responsible for supplying oxygen from the ambient air into the cathode during operational cycling of the battery. Unmitigated accumulations of such byproducts can clog or block these pores and/or pathways, and thereby may reduce the amount of oxygen available at cathode for participating in chemical reactions associated with the generation of an electric current in the lithium-air battery.

Aspects of the present disclosure recognize that conventional lithium-air batteries may not be able to remove lithium oxide products from the cathode, and therefore may not be able to control the accumulation of these lithium oxide products within the pores and/or pathways of the cathode. In accordance with various aspects of the subject matter disclosed herein, an interconnected network of storage pathways and storage cavities of varying dimensions may be provided within the cathode of a lithium-air battery to extract or remove accumulations of these products from the pores and/or pathways responsible for bringing oxygen supplied by ambient air into the cathode, thereby increasing the amount of oxygen that these pores and/or pathways can deliver to the cathode during charge and discharge cycles of the lithium-air battery. By increasing the amount of oxygen available at the cathode to react with lithium oxide and lithium ions during battery charge and discharge cycles, respectively, aspects of the subject matter disclosed herein may increase the specific energy capacity and effective lifespan of lithium-air batteries. In some instances, these pathways may be defined in shape, size and orientation by porous non-hollow carbonaceous spherical particles that coalesce with one another to form larger porous carbonaceous structures within the cathode.

FIG. 1 shows a diagram depicting an example battery 100, according to some implementations. The battery 100 may be a lithium-air battery in fluid communication with ambient air 170 associated with an environment external to the battery 100. In some implementations, the battery 100 includes a body 105 that may contain a cathode 110, an anode 120 positioned opposite to the cathode 110, an electrolyte 130, a solid-electrolyte interface (SEI) layer 140, a polymeric network 150, and a barrier layer 160. In some other implementations, one or more of the SEI layer 140 or the polymeric network 150 may be omitted from the battery 100. Although not shown in FIG. 1 for simplicity, the battery 100 may include a first substrate positioned adjacent the cathode 110 onto which the cathode 110 may be disposed, and may include a second substrate positioned adjacent the anode 120 onto which the anode 120 may be disposed. In some implementations, the first and second substrates may be solid copper metal foils that can be selectively etched, coated with carbonaceous materials, and/or treated with suitable materials to change or tune the energy capacity and the specific energy of the battery 100. In other implementations, the first and second substrates may include or may be formed from a selection of aluminum, copper, nickel, titanium, stainless steel and/or one or more carbonaceous materials.

In some other implementations, the first and second substrates may be at least partially foam-based selected from any one or more of metal foam, metal web, metal screen, perforated metal, or sheet-based 3D structures. In some aspects, the first and second substrates may be a metal fiber mat, metal nanowire mat, conductive polymer nanofiber mat, conductive polymer foam, conductive polymer-coated fiber foam, carbon foam, graphite foam, or carbon aerogel. In some other aspects, the first and second substrates may be carbon xerogel, graphene foam, graphene oxide foam, reduced graphene oxide foam, carbon fiber foam, graphite fiber foam, exfoliated graphite foam, or any combination thereof. The specific composition and configuration of the first and second substrates may vary depending on particular end-use applications and/or performance requirements of the battery 100.

The cathode 110 may serve as a positive electrode of the battery 100. In some implementations, the cathode 110 may include a plurality of interconnected pores 112 and pathways 114 that can diffuse or distribute oxygen supplied by the ambient air 170 throughout the cathode 110 during operational cycling of the battery 100. The pores 112 and pathways 114 may be defined by various porous non-hollow carbonaceous spherical particles disposed, distributed, or otherwise arranged throughout one or more portions of the cathode 110, and groups of the porous non-hollow carbonaceous spherical particles may coalesce with one another to form larger carbonaceous structures within the cathode 110 (for simplicity, neither the porous non-hollow carbonaceous spherical particles nor the larger carbonaceous structures are shown in FIG. 1). The porous non-hollow carbonaceous spherical (NHCS) particles may be adjoined to each other at varying levels of concentration to form the larger carbonaceous structures, where higher concentration levels contribute to higher electrical conductance. In various implementations, a first group of the pores 112 and pathways 114 may be arranged and sized in a manner that allows oxygen supplied by the ambient air 170 to enter and diffuse throughout the cathode 110, and a second group of pathways 114 and cavities 116 may be arranged and sized in a manner that can remove products 180 from the first group of the pores 112 and pathways 114. In some instances, the second group of pathways 114 and cavities 116 can retain or store the byproducts 180 removed from the first group of pores 112 and pathways 114. In this way, the second group of pathways 114 and cavities 116 can keep the first group of pores 112 and pathways 114 clear of byproducts 180 that may accumulate within the cathode 110 and/or attach themselves to surfaces of the first group of pores 112 and pathways 114. As used herein, the terms "transport pores" and "transport pathways" may refer to the first group of pores 112 and pathways 114, and the terms "storage pathways" and "storage cavities" may refer to the second group of pathways 114 and cavities 116, as described in more detail with reference to FIG. 2.

In various implementations, the cathode 110 may include one or more metal catalysts that can enhance the kinetics of oxygen reduction processes within the battery 100, for example, to increase the specific capacity of the battery 100. For example, in some aspects, manganese, cobalt, ruthenium, platinum, silver, or a mixture of cobalt and manganese can be used, either in pure metallic form or as compounds formed with additional metals or other elements, as catalysts for the cathode 110. In some instances, using a manganese oxide catalyst in the cathode 110 may result in a specific capacity of approximately 3,137 mA·H/g carbon.

The anode 120 may serve as a negative electrode of the battery 100. In some implementations, the anode 120 may be formed as a single layer of lithium metal (such as elemental lithium) devoid of any carbon or carbonaceous materials. That is, unlike the anodes employed in many conventional lithium-air batteries, the lithium metal anode 120 used in the battery 100 of FIG. 1 does not include carbon scaffolds or other carbonaceous materials. In this way, the amount of lithium available for oxidation at the anode 120 of the battery 100 may be greater than that of similarly-sized anodes employed in conventional lithium-air batteries, which in turn may increase the energy capacity and the specific energy of the battery 100 relative to these conventional lithium-air batteries. In some instances, the lithium metal anode 120 may be prepared to function with a solid-state electrolyte designed to inhibit the formation and growth of lithium dendrites from the anode 120.

The electrolyte 130 may be dispersed throughout the cathode 110 and in contact with one or more surfaces of the anode 120. The electrolyte 130 may be any suitable material or mixture capable of transporting lithium ions between the anode 120 and cathode 110 during operational cycling of the battery 100. In some implementations, the electrolyte 130 may be a liquid-phase electrolyte (e.g., an aprotic liquid-phase electrolyte solution). In some other implementations, the electrolyte 130 may be solid polymer, gel polymer or substantially solid, e.g., inorganic glassy or ceramic electrolyte. For example, in some instances, the electrolyte 130 may begin in a gel phase and then later solidify upon activation of the battery 100.

The SEI layer 140 may be disposed on one or more surfaces of the anode 120 proximate to or in contact with the electrolyte 130. In some instances, the SEI layer 140 may be formed on the anode 120 in response to reactions between the lithium metal anode 120 and the electrolyte 130 during operational cycling of the battery 100. The SEI layer 140 may include tin, manganese, molybdenum, and/or fluorine compounds. Cations provided by the molybdenum may interact with anions provided by the fluorine compounds to produce one or more types or configurations of salt such as (but not limited to) tin (II) fluoride ($SnF_2$), manganese (II) fluoride ($MnF_2$), silicon nitride ($Si_3N_4$), lithium nitride ($Li_3N$), lithium nitrate ($LiNO_3$), lithium phosphate ($Li_3PO_4$), manganese oxide, or lithium lanthanum zirconium oxide (LLZO, $Li_7La_3Zr_2O_{12}$). In some implementations, the SEI layer 140 may include a mechanical strength enhancer (not shown for simplicity) that provides structural support for the battery 100. In some instances, the mechanical strength enhancer may also prevent lithium dendrite from forming on and/or growing from the anode 120. The mechanical strength enhancer may be formed as a protective coating over the anode 120, and may include one or more carbon allotropes, carbon nano-onions (CNOs), nanotubes (CNTs), reduced graphene oxide, graphene oxide (GO), and/or carbon nano-diamonds. In some other implementations, the SEI layer 140 may not include any mechanical strength enhancers.

The polymeric network 150 may be deposited or formed over one or more exposed surfaces of the anode 120. In some implementations, the polymeric network 150 may be interspersed evenly throughout one or more portions of the SEI layer 140, and may include various carbonaceous structures grafted with fluorinated polymer chains cross-linked with each other (for simplicity, neither the carbonaceous structures nor the fluorinated polymer chains are shown in FIG. 1). Specifically, the carbonaceous materials may be grafted with fluorinated polymer chains and deposited on one or more exposed surfaces of the anode 120. The fluorinated polymer chains can be cross-linked to form the polymeric network 150 when complexed with lithium metal from the anode 120 via the Wurtz reaction. When formed in this manner, the polymeric network 150 may suppress the formation of lithium dendrites from the anode 120. In some implementations, the carbonaceous materials that form a least part of the polymeric network 150 may include (but are not limited to) graphene, few layer graphene, many layer graphene, graphene nanoparticles, 3D graphene scaffolds, and the like. The carbonaceous materials may be chemically grafted with fluorinated polymer chains via carbon-fluorine (C—F) bonds. In some aspects, these C—F bonds may chemically react with lithium metal from the anode 220 to produce highly ionic Carbon-Lithium bonds (C—Li), which in turn may react with the C—F bonds between the carbonaceous materials and the fluorinated polymer chains to form new Carbon-Carbon bonds. These new Carbon-Carbon bonds may also be used to cross-link the polymer chains to form the polymeric network 150.

In some implementations, the polymeric network 150 may include a layer of lithium fluoride (not shown for simplicity). The lithium fluoride layer may be formed in response to chemical bonds between lithium ions 122 and fluorine ions. In some aspects, the lithium fluoride layer may also include lithium fluoride produced by the "new" Carbon-Carbon bonds discussed above. In some instances, the lithium fluoride layer may be uniformly distributed along a perimeter of the polymeric network 150 such that lithium ions 122 are less likely to combine and/or react with each other and are more likely to combine and/or react with fluorine atoms made available by the fluorinated polymer chains embedded in the polymeric network 150. In some other implementations, the battery 100 may not include the polymeric network 150.

The barrier layer 160 may be removably disposed over an exterior surface of the battery body 105 proximate the cathode 110. When the battery 100 is in a dormant state (such as in a warehouse or on a store shelf prior to purchase and activation by a user), the barrier layer 160 may be attached to the battery body 105 and arranged such that the pores 112 and pathways 114 associated with the cathode 110 are sealed from the ambient air 170. In this way, the barrier layer 160 can prevent oxygen supplied by the ambient air 170 from entering the cathode 110 and reacting with lithium within the battery 100. In this way, the barrier layer 160 may prevent inadvertent activation of the battery 100 while in the dormant state.

In some implementations, a user may activate the battery 100 by removing the barrier layer 160 from the exterior surface of the battery body 105. For example, when the barrier layer 160 is removed or otherwise not present, oxygen supplied by the ambient air 170 can enter the pores 112 and pathways 114 formed in the cathode 110 and diffuse throughout the cathode 110. As discussed, the oxygen may be used to oxidize lithium provided by the anode 120 during battery discharge cycles, and may be used for oxygen reduction reactions during battery discharge cycles. As such, removing the barrier layer 160 from the exterior surface of the battery body 105 so that oxygen provided by the ambient air 170 can enter the cathode 110 and participate in various chemical reactions within the battery 100 activates the battery 100.

In some aspects, the battery 100 may also include a separator (not shown for simplicity) that can further inhibit dendrite formation on and growth from the anode 120. The separator may have a similar ionic conductivity as the electrolyte 130 and yet still inhibit lithium dendrite formation. In some aspects, the separator may be formed from a ceramic containing material that does not chemically react with metallic lithium, and may therefore be used to control lithium ion transport through the separator while preventing a short-circuit by impeding the flow or passage of electrons through the electrolyte 130.

As discussed, when the battery 100 is configured to operate as a lithium-air battery, oxygen supplied by the ambient air 170 is used as the active cathode material. The use of oxygen supplied by the ambient air 170 as the active cathode material may ensure a plentiful supply of the cathode active material without relying on storage of the active material within the cathode 110. Specifically, during battery discharge cycles, lithium supplied by the anode 120 is oxidized by the ambient air 170 to produce lithium ions 122 and free electrons 124. The half-reaction occurring at the anode 120 may be expressed as:

$$Li \approx Li^+ + e^- \qquad (Eq. 1)$$

The lithium ions 124 migrate from the anode 120 to the cathode 110 through the electrolyte 130. Oxygen gas (O2) provided by the ambient air 170 enters the transport pores 112 of the cathode 110 and diffuses throughout the cathode 110 via the transport pathways 114. The oxygen gas reacts with lithium ions 122 at the cathode 110 to produce lithium oxide. The free electrons 124 may travel from the anode 120 to the cathode 110 through an external circuit, thereby providing an electric current that can power a load 190 associated with the external circuit. The half-reactions occurring at the cathode 110 may be expressed as:

$$4Li + O_2 \rightarrow 2Li_2O (E^0 = 2.9\ V) \qquad (Eq. 2)$$

$$2Li + O_2 \rightarrow Li_2O_2 (E^0 = 3.1\ V) \qquad (Eq. 3)$$

During each battery charge cycle, the above process is reversed. That is, oxygen supplied by the ambient air 170 donates electrons to at least some of the lithium oxide at the cathode 110 to produce lithium ions 122 and electrons 124. The electrochemical potential between the anode 120 and the cathode 110 may force these lithium ions 122 from their electrochemically-favored positions in the cathode 110 back to the anode 120 through the electrolyte 130. The lithium ions 122 may accumulate at the anode 120 and plate the anode 120 with lithium, thereby replenishing the supply of lithium at the anode 122.

As discussed, chemical reactions between lithium ions 122 and oxygen at the cathode 110 produce lithium oxides such as lithium peroxide ($Li_2O_2$) and lithium superoxide ($Li_2O$). Lithium oxides are not soluble in aprotic electrolytes, and therefore cannot be dispersed away from the cathode 110 via the electrolyte 130. Instead, these products may be trapped within the cathode 110. Specifically, these products may attach themselves to the transport pores 112 and transport pathways 114 within the cathode 110 after each discharge cycle of the battery 100. Over time, these products may accumulate on and/or within the various transport pores 112 and transport pathways 114 responsible for diffusing oxygen from the ambient air 170 throughout the cathode 110, thereby clogging or blocking these various transport pores 112 and transport pathways 114 and reducing the amount of oxygen available at the cathode 120. The resulting decrease in the amount of oxygen available at the cathode 110 may reduce the amount of lithium ions 122 and free electrons 124 generated during operational cycling of the battery 100, which in turn may decrease the amount of electric current that can be delivered to the load 190.

In some aspects, the production of these products may be expressed as:

$$Li^+ + e^- + O_2 + * \rightarrow LiO_2 \qquad (Eq. 4)$$

$$Li^+ + e^- + LiO_2^* \rightarrow Li_2O_2^* \qquad (Eq. 5)$$

where "*" denotes a neutral Li vacancy on the surface of lithium peroxide ($Li_2O_2$) byproducts.

Various aspects of the subject matter disclosed herein may remove lithium oxide and lithium peroxide generated during operation of the battery 100 from the transport pores 112 and transport pathways 114 responsible for providing oxygen from the ambient air 170 to the cathode 110 during operational cycling of the battery 100, thereby allowing the transport pores 112 and transport pathways 114 to provide sufficient amounts of oxygen to the cathode 110 to ensure proper operation of the battery 100. In some implementations, the cathode 110 may include a network of storage pathways and storage cavities in fluid communication with the network of transport pores 112 and transport pathways 114. In some aspects, the network of storage pathways may remove these products from the transport pores 112 and transport pathways 114, and the network of storage cavities may store or otherwise retain products removed from the network of transport pores 112 and transport pathways 114, as described in more detail with reference to FIG. 2. In this way, lithium oxide and lithium peroxide generated during operation of the battery 100 do not accumulate at openings into the pores 112 and into their corresponding transport pathways 114, thereby providing ongoing unimpeded access into interior regions of the cathode 110 as may be necessary for optimal battery functioning.

Figure 2:
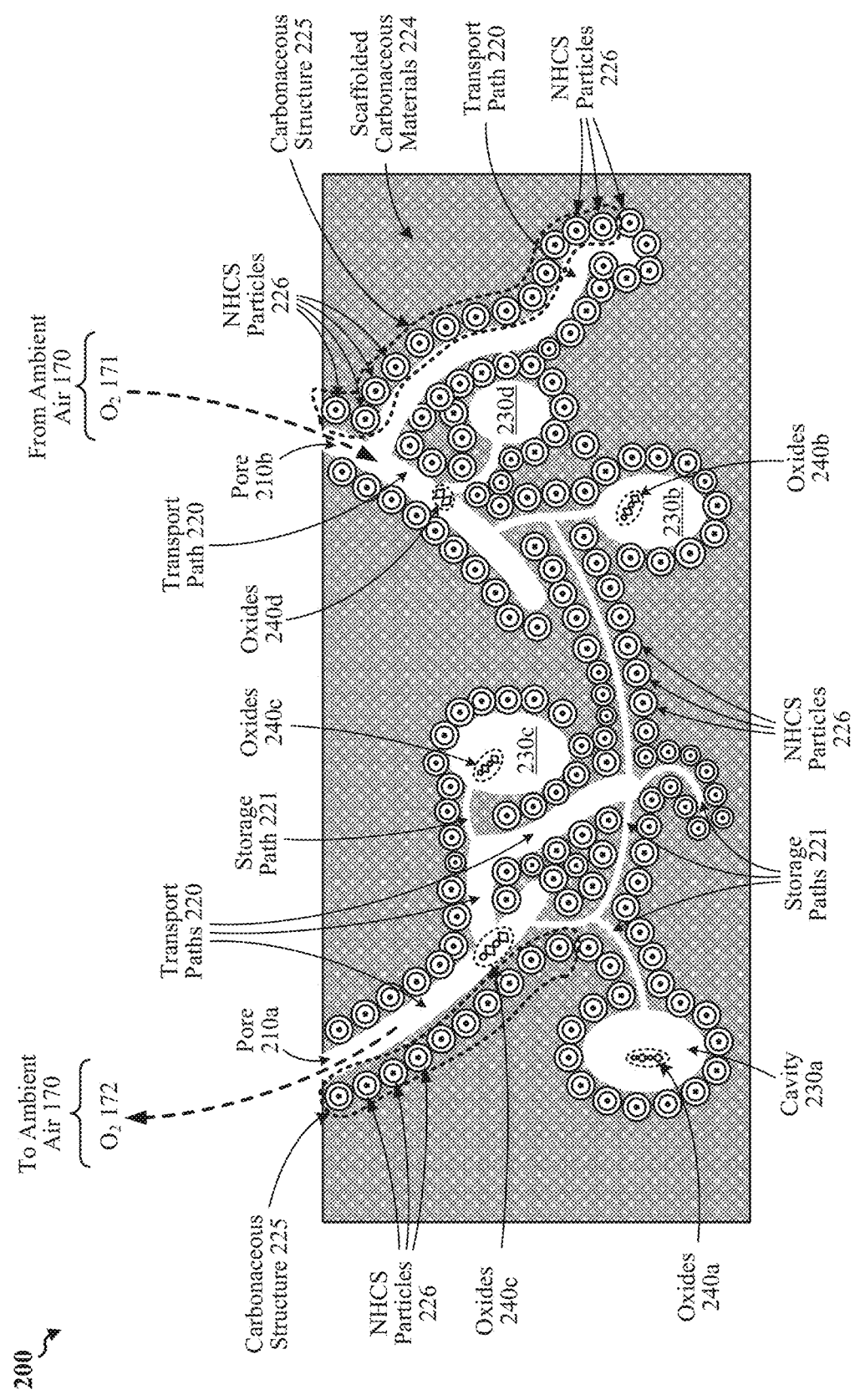
FIG. 2 shows a diagram depicting the cathode of the battery of FIG. 1, according to some implementations.

FIG. 2 shows a diagram depicting a cathode 200, according to some implementations. The cathode 200 may be one example of the cathode 110 of FIG. 1 and be formed of scaffolded carbonaceous materials 224 (e.g., coalesced agglomerations of few layer graphene other than a plurality of carbonaceous structures 225 and/or group of porous non-hollow carbonaceous spherical (NHCS) particles 226). The scaffolded carbonaceous materials 224 and/or the plurality of carbonaceous structures 225 may, in some aspects, have improved resistance to oxidation during battery charge cycling relative to conventional carbonaceous materials used to form lithium-air battery cathodes. This improved resistance to oxidation may correspondingly improve lithium-air battery cycle life. In addition, graphenated materials within any one or more of the plurality of carbonaceous structures 225 may be functionalized with polar groups to, for example, improve wetting of surfaces within respective carbonaceous structures 225 exposed to aprotic solvents and/or electrolytes. In some implementations, the cathode 200 may include a plurality of pores 210a-210b, a plurality of transport pathways 220, a plurality of storage pathways 221, and a plurality of cavities 230a-230d formed throughout the cathode 200. In some aspects, the pores 210a-210b may be examples of the pores 112 of FIG. 1, the pathways 220 and 221 may be examples of the pathways 114 of FIG. 1, and the cavities 230a-230d may be examples of the cavities 116 of FIG. 1. That is, the pores 210a-210b and the pathways 220 may be transport pores and transport pathways, respectively, responsible for supplying oxygen 171 from the ambient air 170 into the cathode 200 and for releasing oxygen 172 back into the ambient air 170, while the pathways 221 and cavities 230a-230d may be transport pathways and transport cavities, respectively, responsible for removing products from the transport pores 210a-210b and the transport pathways 220. Although the example of FIG. 2 shows only two transport pores 210a-210b, several transport pathways 220 and storage pathways 221, and four cavities 230a-230d, in other implementations, the cathode 200 may include other numbers of transport pores 210a-210b, transport pathways 220, storage pathways 221, and cavities 230a-230d.

In some implementations, the transport pores 210a-210b and the transport pathways 220 may form a transport network that is in fluid communication with a storage network formed by the storage pathways 221 and the storage cavities 230a-230d. For example, during operational cycling of the battery 100, oxygen 171 provided by the ambient air 170 may enter the cathode 200 through transport pore 210a and may be distributed throughout the cathode 200 by the transport pathways 220. In addition, oxygen 172 may be released from the cathode 200 back into the ambient air 170 via the transport pathways 220 and transport pore 210b. In this way, the transport pores 210 and transport pathways 220 may collectively operate to deliver oxygen from the ambient air 170 into the cathode 200 in a manner that ensures sufficient quantities of oxygen are available for oxidization and reduction processes associated with operational cycling of the battery 100. The storage pathways 221 may collectively operate to remove products (such as lithium dioxide and lithium superoxide) from the transport pores 210 and transport pathways 220. In some instances, the storage pathways 221 may guide these products towards one or more of the storage cavities 230a-230d, for example, which can retain or store these removed byproducts. In this manner, the storage pathways 221 and storage cavities 230a-230d may prevent these products from accumulating in the cathode 200 and blocking one or more of the transport pores 210 and/or transport pathways 220.

In some implementations, the transport pores 210a-210b, the transport pathways 220, the storage pathways 221, and the storage cavities 230a-230d may be defined in shape, size and/or orientation by the plurality of carbonaceous structures 225 distributed throughout the cathode 200. At least some of the plurality of carbonaceous structures 225 may be hydrophilic, e.g., when implemented as a formative material to define the cathode 200. Hydrophilic carbonaceous materials within at least some of the plurality of carbonaceous structure 225 may attract and/or retain water vapor as necessary to facilitate and/or assist with at least some of the chemical reactions associated with the present disclosure. Usage of a "bottoms-up" synthetic procedure (e.g., referring to self-nucleation from a carbon-containing vapor flow stream within a reaction vessel) may enable for the preparation of at least some exposed surfaces of the plurality of carbonaceous structures 225 to be hydrophilic. In some instances, each of the carbonaceous structures 225 may be formed by the coalescence of a corresponding group of porous non-hollow carbonaceous spherical (NHCS) particles 226. In some aspects, the pores 210 may have a principal dimension (e.g., width or diameter) in an approximate range between 0.6 nanometers (nm) and 6.6 nm to retain the reaction byproducts, and the transport pathways 220 may each have a diameter approximately between 5.0 and 10.0 microns (or other suitable dimension that allows oxygen gas provided by the ambient air 170 to flow into and diffuse throughout the cathode 200). The disclosed dimensions may accommodate wetting (e.g., by condensation of vapor onto the respective surfaces) of exposed surfaces of at least some of the plurality of carbonaceous structures 225, (e.g., 3.0 nm-5.5. nm, 5.5 nm-6.0 nm, etc.). In addition, control of polarity of at least some exposed surfaces of respective carbonaceous structures 225 may facilitate and/or reduce evaporation of solvents (e.g., carbonates, ethers, and/or esters, and/or aprotic solvents, etc.). In this way, it is possible to finely tune surface interactions between at least some of the solvents introduced into the cathode 200 and carbonaceous surfaces of the plurality of carbonaceous structures 225 exposed to the solvents.

The storage pathways 221 may each have a diameter approximately between 0.1 and 5.0 microns (or other suitable dimension that can remove lithium oxide products from the transport pathways 220 and deposit the lithium oxide products into one or more of the cavities 230a-230d). In some aspects, one or more of the transport pathways 220 may be connected to one or more of the storage pathways 221 associated with the storage site network. For example, as depicted in FIG. 2, each of the storage cavities 230a-230d associated with the network of storage sites may be connected to the pores 210 and/or the transport pathways 220 via corresponding storage pathways 221 distributed throughout the cathode 110. In some aspects, the discharge capacity of the battery 100 may be based at least in part on the diameter of the storage pathways 221 relative to the diameter of the transport pathways 220. For example, transport pathways 220 having relatively large diameters may induce greater amounts of oxygen 171 per unit time than transport pathways 220 having relatively small diameters.

Aspects of the present disclosure recognize that one or more portions of the lithium oxide products produced during operational cycling of the battery 100 typically remain within a predefined range of a respective pore opening. As such, these portions of the lithium oxide byproducts may not travel far enough to the transport pathways 220, but instead may block the openings of pores such as pores 210a-210b. As a result, in some aspects, larger pore diameters may result in faster battery discharge rates.

In some implementations, each carbonaceous structure 225 may include multiple NHS particles 226, each which may include and/or be formed from a stack of 3-15 graphene nanosheets (not shown in FIG. 2). Each graphene nanosheet may have a principal dimension of less than 1 μm, where some graphene nanosheets may include mesopores. For example, each mesopore may have a volume approximately greater than 1 $^{cc}/_g$, (e.g., 1.5 $^{cc}/_g$-2.0 $^{cc}/_g$). During manufacturing, the cathode 200 may be formed from carbon-containing free-radical species that self-nucleate without requiring a seed particle to form innate 3D carbonaceous structures, including graphene nanosheets doped with nitrogen and/or sulfur. In some aspects, the cathode 200 may be treated with ozone ($O_3$) during production to define carbonaceous structures therein, such that the cathode has a surface area in an approximate range between 5 $m^2/_g$-3,000 $m^2/_g$. In addition, the cathode 200 may include one or more surfaces exposed to the ambient air 170, such that a catalyst (e.g., manganese oxide, nickel oxide, cobalt, platinum, gold, etc.) may be deposited on the surfaces.

Heteroatom doping of graphene used to produce the NHCS particles 225 of FIG. 2 may improve overall electroactivity of the cathode 200. For example, nitrogen-doped carbon nanotubes with up to 10.2 atomic percent (at %) nitrogen may be used as formative cathode materials for the NHCS particles 225 of the cathode 200. In addition, pyridinic nitrogen nitrogen-rich carbon materials can be used to form the NHCS particles 225 and provide oxygen adsorption. For example, in-plane pyridinic nitrogen may demonstrate higher activity in facilitating nucleation of lithium peroxide clusters compared with pristine and/or graphitic nitrogen. By doping multiple types of heteroatoms into carbonaceous materials of the cathode, many bifunctional cathode materials may be applied to the cathode 200, such as nitrogen-doped carbon nano-tubes (CNTs), nitrogen-doped graphene, sulfur-doped graphene, and nitrogen, sulfur co-doped graphene. Nitrogen doping may improve catalytic activity of carbonaceous materials by manipulating local electronic structures, thereby providing higher concentrations of electroactive sites per unit volume. Sulfur-doped graphene may provide cycling stability as well, due to the stability of —C—S—C— and —C=S— structures.

3D nano-porous non-doped, N-doped, and S-doped graphene materials may be used to synthesize the NHS particles 222 for the cathode 110 by a nano-porous metal based chemical vapor deposition (CVD) method with benzene, pyridine, or thiophene as carbon, nitrogen, and sulfur sources. Alternatively, metal-free graphene may be used to produce the NHCS particles 225 for the cathode 200 to provide a capacity of 10,400 mAh/g and for up to 300 cycles at 1,000 mAh/g. The charge overpotentials of the cathode 200 when configured with such nano-porous graphene may be relatively high, which may result in a relatively low energy efficiency. This issue may be addressed by tuning the surface chemistry of the nano-porous graphene and/or integrating with a compatible redox mediator that favors charging.

Figure 3:
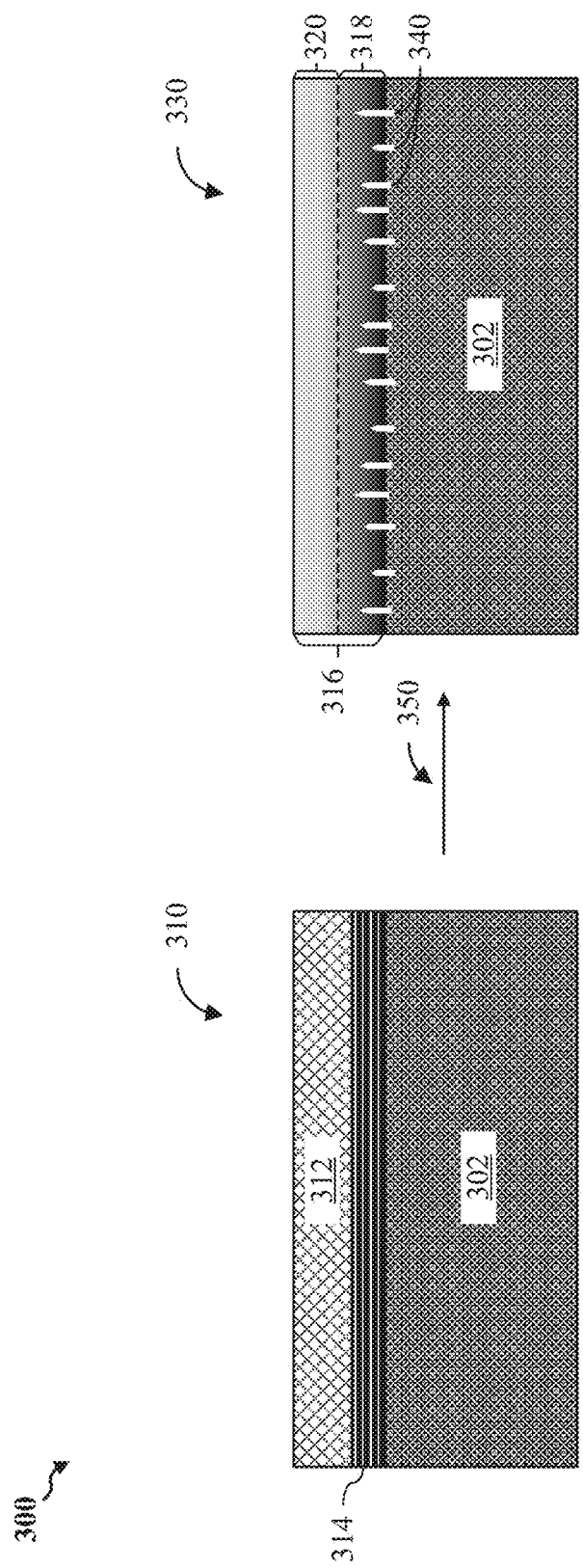
FIG. 3 shows a diagram of a polymeric network, according to some implementations.

FIG. 3 shows a diagram 300 of an example polymeric network 310, according to some implementations. In some aspects, the polymeric network 310 may be one example of the polymeric network 150 of FIG. 1. The polymeric network 310 may electrically non-conductive, and may be disposed on an anode 302. In this way, the polymeric network 310 may avoid additional lithium plating on exposed lithium-containing surfaces (e.g., raised surfaces relative to the bulk of the anode 302.) The anode 302 may be formed as an alkali metal layer having one or more exposed surfaces that include any number of alkali metal-containing nanostructures or microstructures. The alkali metal may include (but is not limited to) lithium, sodium, zinc, indium and/or gallium. The anode 302 may release alkali ions during operational cycling of the battery.

A layer 314 of carbonaceous materials may be grafted with fluorinated polymer chains and deposited over one or more exposed surfaces of the anode 302. The grafting may be based on (e.g., initiated by) activation of carbonaceous material with one or more radical initiators, for example, benzoyl peroxide (BPO) or azobisisobutyronitrile (AIBN), followed by reaction with monomer molecules. The polymeric network 310 may be based on the fluorinated polymer chains cross-linked with one another and carbonaceous materials of the layer 314 such that the layer 314 is consumed during generation of the polymeric network 310. In some implementations, the polymeric network 310 may have a thickness approximately between 0.001 µm and 5 µm and include between approximately 0.001 wt. % to 2 wt. % of the fluorinated polymer chains. In some other implementations, the polymeric network 310 may include between approximately 5 wt. % to 100 wt. % of the plurality of carbonaceous materials grafted with fluorinated polymer chains and a balance of fluorinated polymers, or one or more non-fluorinated polymers, or one or more cross-linkable monomers, or combinations thereof. In one implementation, carbonaceous materials grafted with fluorinated polymer chains may include 5 wt. % to 50 wt. % of fluorinated polymer chains and a balance of carbonaceous material.

During battery cycling, carbon-fluorine bonds within the polymeric network 310 may chemically react with lithium metal and convert into carbon-lithium bonds (C—Li). These C—Li bonds may, in turn, further react with carbon-fluorine bonds within the polymeric network 310 via a Wurtz reaction 350, to further cross-link polymeric network by newly forming carbon-carbon (C—C) bonds and to also yield an alkali-metal containing fluoride, e.g., lithium fluoride (LiF). Additional polymeric network cross-linking leading to uniform formation of the alkali-metal containing fluoride may thereby suppress alkali metal dendrite formation 340 associated with the anode 302, thereby improving battery performance and longevity. In one implementation, grafting of fluorinated m/acrylate (FMA) to one or more exposed graphene surfaces of carbonaceous materials in the layer 314 may be performed in an organic solution, e.g., leading to the formation of graphene-graft-poly-FMA and/or the like. Incorporation of carbon-fluorine bonds on exposed graphene surfaces may enable the Wurtz reaction 350 to occur between carbon-fluorine bonds and metallic surface of an alkali metal (e.g., lithium) provided by the anode 302. In this way, completion of the Wurtz reaction 350 may result in the formation of the polymeric network 330. In some aspects, the polymeric network 330 may include a density gradient 316 pursuant to completion of the Wurtz reaction 350. The density gradient 316 may include interconnected graphene flakes and may be infused with one or more metal-fluoride salts formed in-situ. In addition, layer porosity and/or mechanical properties may be tuned by carbon loading and/or a combination of functionalized carbons, each having a unique and/or distinct physical structure.

In some implementations, carbonaceous materials within the density gradient 316 may include one or more of flat graphene, wrinkled graphene, carbon nano-tubes (CNTs), or carbon nano-onion (CNO) shaped spherical non-hollow structures (e.g., as depicted in FIGS. 4A and 4B). In one implementation, graphene nanoplatelets may be dispersed throughout and isolated from each other within the polymeric network 310. The dispersion of the graphene nanoplatelets includes one or more different concentration levels. In one implementation, the dispersion of the graphene nanoplatelets may include at least some of the carbonaceous materials functionalized with at least some of the fluorinated polymer chains.

For example, the fluorinated polymer chains may include one or more acrylate or methacrylate monomers including 2,2,3,3,4,4,5,5,6,6,7,7-Dodecafluoroheptyl acrylate (DFHA), 3,3,4,4,5,5,6,6,7,7,8,8,9,9,10,10,10-Heptadecafluorodecyl methacrylate (HDFDMA), 2,2,3,3,4,4,5,5-Octafluoropentyl methacrylate (OFPMA), Tetrafluoropropyl methacrylate (TFPM), 3-[3,3,3-Trifluoro-2-hydroxy-2-(trifluoromethyl)propyl]bicyclo[2.2.1]hept-2-yl methacrylate (HFA monomer), or vinyl-based monomers including 2,3,4,5,6-Pentafluorostyrene (PFSt).

In some implementations, fluorinated polymer chains may be grafted to a surface of the layer of carbonaceous materials and may thereby chemically interact with the one or more surfaces of the alkali metal of the anode via the Wurtz reaction 350. In organic chemistry, organometallic chemistry, and inorganic main-group polymers, the Wurtz reaction is a coupling reaction, whereby two alkyl halides are reacted with sodium metal (or some other metal) in dry ether solution to form a higher alkane. In this reaction alkyl halides are treated with alkali metal, for example, sodium metal in dry ethereal (free from moisture) solution to produce higher alkanes. For a lithium intermediate product of the Wurtz reaction, highly polar and highly reactive carbon-lithium metal bonds are produced, which in turn chemically react with carbon-halide (e.g., fluoride) bonds to yield newly formed C—C bonds and lithium fluoride. A formation of new C—C bonds allows to use the Wurtz reaction for the preparation of higher alkanes containing even number of carbon atoms, for example:

$$C-F + 2Li \rightarrow C-Li^+ + LiF \qquad (Eq. 4)$$

$$C-Li^+ + C-F \rightarrow C-C + LiF \qquad (Eq. 5)$$

Other metals have also been used to influence Wurtz coupling, among them silver, zinc, iron, activated copper, indium and a mixture of manganese and copper chloride. The related reaction dealing with aryl halides is called the Wurtz-Fittig reaction. This can be explained by the formation of free radical intermediate and its subsequent disproportionation to give alkene. The Wurtz reaction 350 occurs through a free-radical mechanism that makes possible side reactions producing alkene products. In some implementations, chemical interactions associated with the Wurtz reaction described above may form an alkali metal fluoride, e.g., lithium fluoride.

In one implementation, the polymeric network 310 may include an interface layer 318 in contact with the anode 302. A protective layer 320 may be disposed on top of the interface layer 318, which may be based on the Wurtz reaction 350 at an interface between the anode 302 and the polymeric network 310. The interface layer 318 may have a relatively high cross-linking density (e.g., of fluorinated polymers and/or the like), a high metal-fluoride concentration, and a relatively low carbon-fluorine bond concentration. In contrast to the interface layer 318, the protective layer 320 may have a relatively low cross-linking density, a low metal-fluoride concentration, and a high carbon-fluorine bond concentration.

In some implementations, the interface layer 318 may include cross-linkable monomers such as methacrylate (MA), acrylate, vinyl functional groups, or a combination of epoxy and amine functional groups. In one implementation, the protective layer 320 may be characterized by the density gradient 316. In this way, the density gradient 316 may be associated with one or more self-healing properties of the protective layer 320 and/or may strengthen the polymeric network 310. In some implementations, the strengthened protective layer 320 may further suppress alkali metal dendrite formation 340 from the anode 302 during battery cycling.

Operationally, the interface layer 318 may suppress alkali metal dendrite formation 340 associated with the anode 302 by uniformly producing metal-fluorides, e.g., lithium fluoride, at an interface across the length of the anode 302. The uniform production of metal fluorides causes dendrite surface dissolution, e.g., via conversion into metal-fluorides, ultimately suppressing alkali metal dendrite formation 340. In addition, cross-linking of fluorinated polymer chains over remaining dendrites may further suppress alkali metal dendrite formation 340. In some implementations, the density gradient 316 may be tuned to control the degree of cross-linking between the fluorinated polymer chains.

FIG. 4A shows a micrograph 400 of plurality of carbonaceous spherical particles 402, according to some implementations. In some instances, the carbonaceous spherical particles 402 may be examples of the NHCS particles 226 of FIG. 2. Each of the carbonaceous spherical particles 402 may include a non-hollow core region having a relatively low carbon density that is surrounded by various monolithic carbon growths and/or layering having a relatively high carbon density. The carbonaceous spherical particles 402 may include several concentric multi-layered fullerenes and/or similarly shaped carbonaceous structures organized at varying levels of density and/or concentration. For example, the final shape, size, and graphene configuration of each of the carbonaceous spherical particles 402 may depend on various manufacturing processes. The carbonaceous spherical particles 402 may, in some aspects, demonstrate poor water solubility. As such, in some implementations, non-covalent functionalization may be utilized to alter one or more dispersibility properties of the carbonaceous spherical particles 402 without affecting the intrinsic properties of the underlying carbon nanomaterial. In some aspects, the underlying carbon nanomaterial may be formative a $sp^2$ carbon nanomaterial. In some implementations, each of the carbonaceous spherical particles 402 may have a diameter between approximately 20 and 500 nm. In various implementations, groups of the carbonaceous spherical particles 402 may coalesce and/or aggregate to form carbonaceous structures 404. In some instances, the carbonaceous structures 404 may be examples of the carbonaceous structures 225 of FIG. 2). In addition, groups of the carbonaceous structures 404 may coalesce and/or join together to form agglomerates 406.

FIG. 4B shows a micrograph 450 of carbonaceous structures 460, according to some implementations. In some instances, the carbonaceous structure 460 may be an example of the carbonaceous structures 404 of FIG. 4A. In one implementation, exterior carbonaceous shell-type structures 442, 444, and 446 may fuse together to form the carbonaceous structure 460. A group of the carbonaceous structures 460 may coalesce and/or join with one another to form the agglomerate 406 of FIG. 4A. In some aspects, a core region 448 of a respective carbonaceous shell-type structure 446 may be tunable, for example, in that the core region 448 may include various defined concentration levels of interconnected graphene structures. In some implementations, the respective carbonaceous shell-type structure 446 may have a first concentration of interconnected carbons approximately between 0.1 g/cc and 2.3 g/cc at or near the respective carbonaceous shell-type structure 446. The respective carbonaceous shell-type structure may have pores to transport lithium ions extending inwardly from toward the core region 448.

In some implementations, the pores in each of the carbonaceous shell-type structures 442, 444, and 446 may have a width or dimension between approximately 0.0 nm and 0.5 nm, between approximately 0.0 and 0.1 nm, between approximately 0.0 and 6.0 nm, or between approximately 0.0 and 35 nm. Each of the carbonaceous shell-type structures 442, 444, and 446 may also have a second concentration at or near the core region 448 that is different than the first concentration. For example, the second concentration may include several relatively lower-density carbonaceous regions arranged concentrically. In one implementation, the second concentration may be lower than the first concentration at between approximately 0.0 g/cc and 1.0 g/cc or between approximately 1.0 g/cc and 1.5 g/cc. In some aspects, the relationship between the first concentration and the second concentration may be used to maximize transport of lithium ions and intake of gaseous oxygen, while concurrently providing a suitable retention location for lithium oxides.

In some implementations, at least some of the carbonaceous shell-type structures 442, 444, and 446 may include carbon nano-onion (CNO) oxides organized as a monolithic and/or interconnected growths and be produced in a thermal reactor. In one implementation, the carbonaceous shell-type structures 442, 444, and 446 may be decorated with cobalt nanoparticles according to the following example recipe: cobalt(II) acetate ($C_4H_6CoO_4$), the cobalt salt of acetic acid (often found as tetrahydrate $Co(CH_3CO_2)_2 \cdot 4\ H_2O$, which may be abbreviated as $Co(OAc)_2 \cdot 4\ H_2O$, may be flowed into the thermal reactor at a ratio of approximately 59.60 wt % corresponding to 40.40 wt % carbon (referring to carbon in CNO form), resulting in the functionalization of active sites on the CNO oxides with cobalt. In some implementations, suitable gas mixtures used to produce cobalt-decorated CNOs may include the following steps:

Ar purge 0.75 standard cubic feet per minute (scfm) for 30 min;

Ar purge changed to 0.25 scfm for run;
temperature increase: 25° C. to 300° C. 20 mins; and
temperature increase: 300°-500° C. 15 mins.

Carbonaceous materials described with reference to FIGS. 4A and 4B may include or otherwise be formed from one or more instances of graphene, which may include a single layer of carbon atoms with each atom bound to three neighbors in a honeycomb structure. The single layer may be a discrete material restricted in one dimension, such as within or at a surface of a condensed phase. For example, graphene may grow outwardly only in the x and y planes (and not in the z plane). In this way, graphene may be a two-dimensional (2D) material, including one or several layers with the atoms in each layer strongly bonded (such as by a plurality of carbon-carbon bonds) to neighboring atoms in the same layer.

In some implementations, graphene nanoplatelets (e.g., formative structures included in each of the carbonaceous shell-type structures 442, 444, and 446) may include multiple instances of graphene, such as a first graphene layer, a second graphene layer, and a third graphene layer, all stacked on top of each other in a vertical direction, to form ornate and innate 3D carbonaceous structures. Each of the graphene nanoplatelets, which may be referred to as a GNP, may have a thickness between 1 nm and 3 nm, and may have lateral dimensions ranging from approximately 100 nm to 100 μm. In some implementations, graphene nanoplatelets may be produced by multiple plasma spray torches arranged sequentially by roll-to-roll (R2R) production. In some aspects, R2R production may include deposition upon a continuous substrate that is processed as a rolled sheet, including transfer of 2D material(s) to a separate substrate. The plasma spray torches used in the R2R processes may spray carbonaceous materials at different concentration levels to create specific concentration levels of graphene nanoplatelets, thereby providing a fine level of tunability for the cathode 110 of FIG. 1 and/or the cathode 200 of FIG. 2.

Figure 5A:
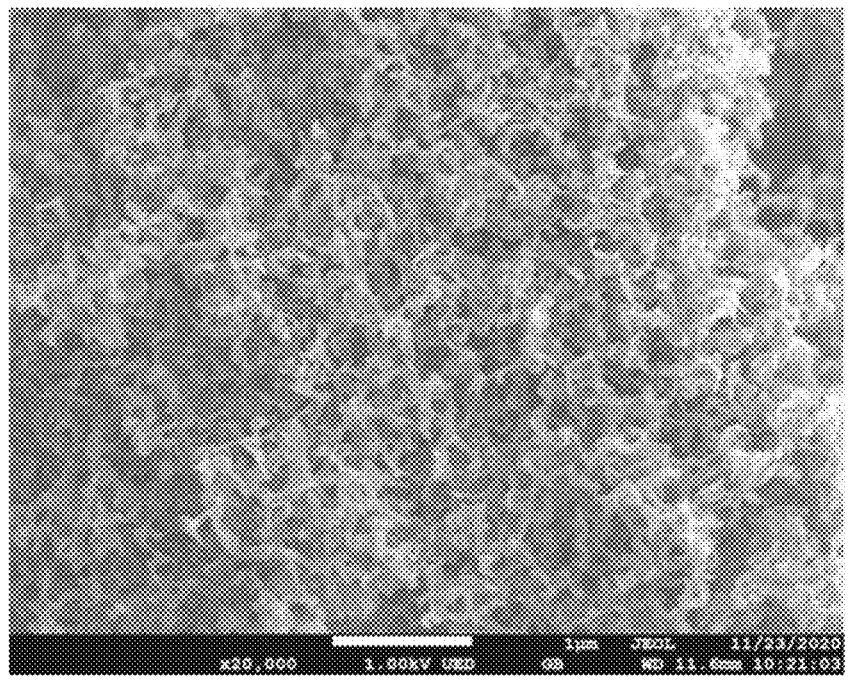
FIG. 5A shows an SEM micrograph of graphene powder, according to some implementations.

FIG. 5A shows an SEM micrograph 500A of graphene powder, according to some implementations. Adjacent graphenated sheets and/or layers of micrograph 500A may have a convoluted and 3D structure to prevent graphene restacking, avoiding several drawbacks of using 2D graphene.

Figure 5B:
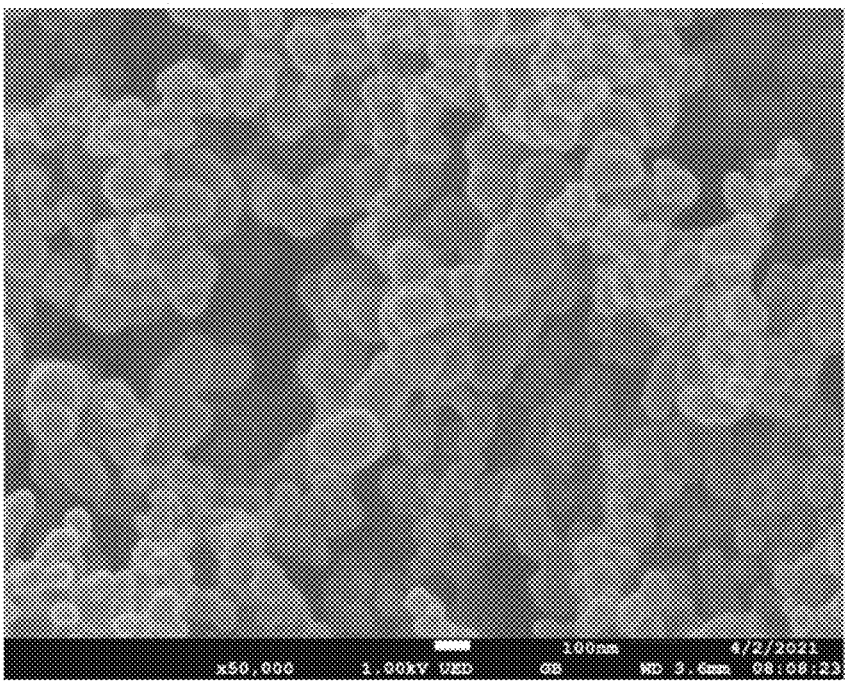
FIG. 5B shows an SEM micrograph of nodular carbon produced by thermal processes, according to some implementations.

FIG. 5B shows an SEM micrograph 500B of nodular carbon produced by thermal processes, according to some implementations. The nodular carbon shown in micrograph 500B may be used to produce the NHS particles 222 in the cathode 110 of FIG. 1 and/or FIG. 2. In this way, the nodular carbon of micrograph 500B may produce the unique dual-pore system capable of concurrently retaining lithium oxides while facilitating free passage of gaseous oxygen into interior regions of the cathode 110 as necessary for optimal lithium-air battery operation. Nodular carbon shown in micrograph 500B may feature pores, each pore having a diameter in an approximate range between 0.6 nanometers (nm) and 6.6 nm, thereby permitting for retention of lithium oxide within these pores.

Figure 5C:
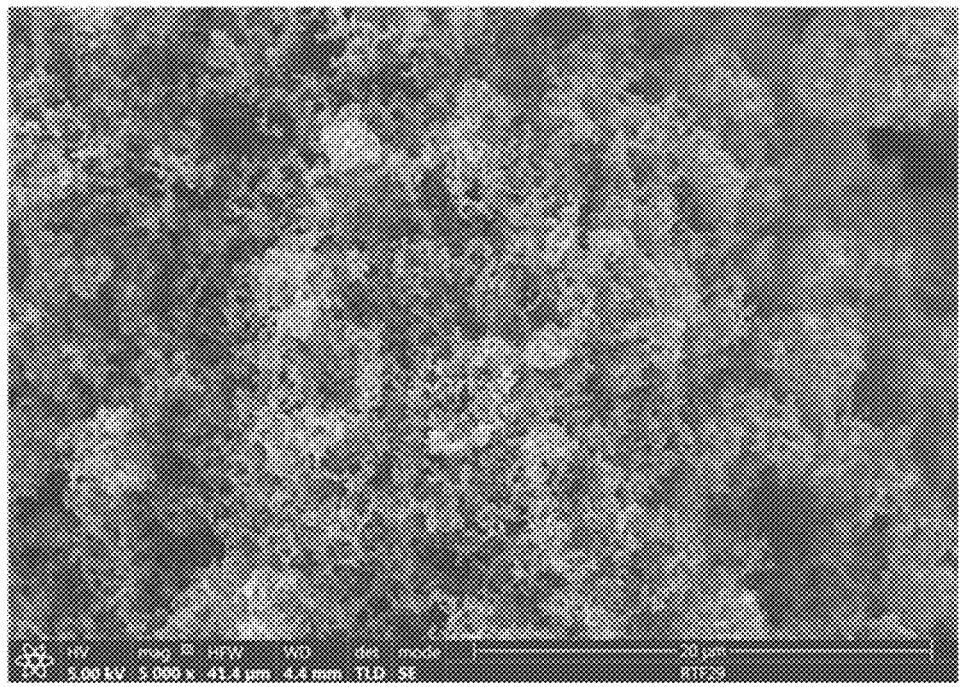
FIG. 5C shows an SEM micrograph of carbon-dioxide ($CO_2$) treated carbon, according to some implementations.

FIG. 5C shows an SEM micrograph 500C of carbon-dioxide ($CO_2$) treated carbon, according to some implementations. The 3D graphenated and/or carbonaceous materials shown in micrograph 500C may be produced by $CO_2$ treatment and used to produce the NHS particles 222 of the cathode 110 of FIGS. 1 and/or 2 of the battery 100 of FIG. 1.

Figure 5D:
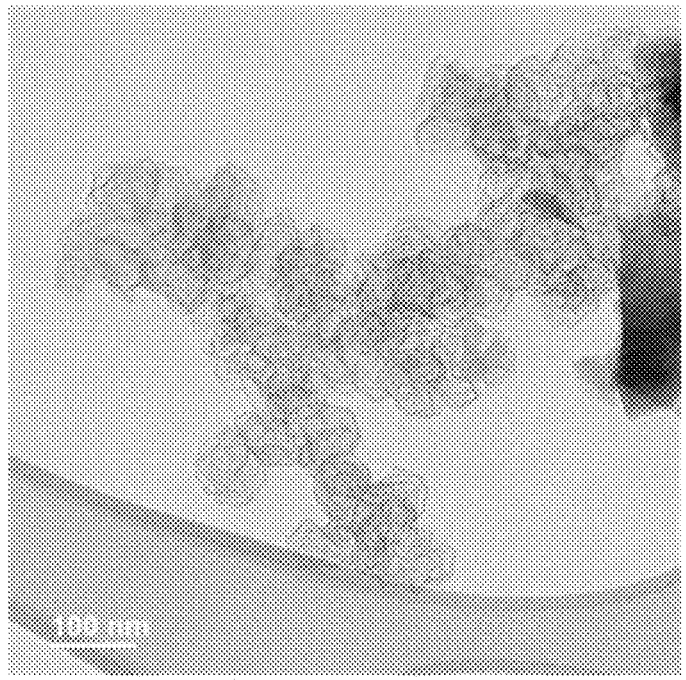
FIG. 5D shows an SEM micrograph of carbon-dioxide ($CO_2$) treated carbon, according to some other implementations.

FIG. 5D shows an SEM micrograph 500D of carbon-dioxide ($CO_2$) treated carbon, according to some other implementations. The 3D graphenated and/or carbonaceous materials shown in micrograph 500C may be produced by $CO_2$ treatment and used to produce the NHCS particles 226 of the cathode 110 of FIGS. 1 and/or 2 of the battery 100 of FIG. 1.

Figure 6:
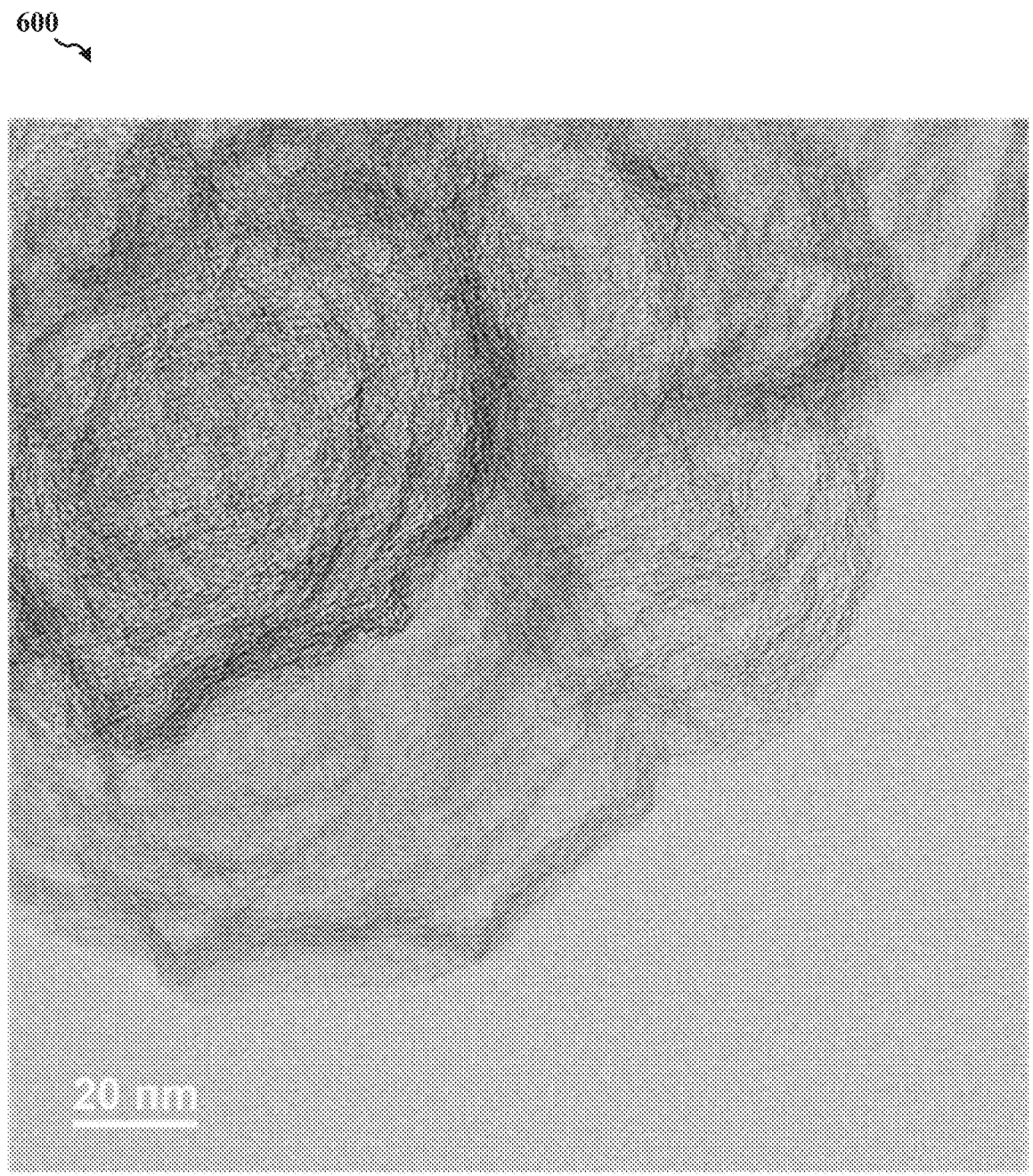
FIG. 6 shows a micrograph of a three-dimensional (3D) graphene after carbon dioxide ($CO_2$) treatment, according to some implementations.

FIG. 6 shows a micrograph 600 of a three-dimensional (3D) graphene after carbon dioxide ($CO_2$) treatment, according to some implementations. In some instances, the treated 3D graphene may be used to produce the NHCS particles 226 of the cathodes 110 of the lithium-air batteries 100 and 200 of FIGS. 1 and 2, respectively.

Figure 7:
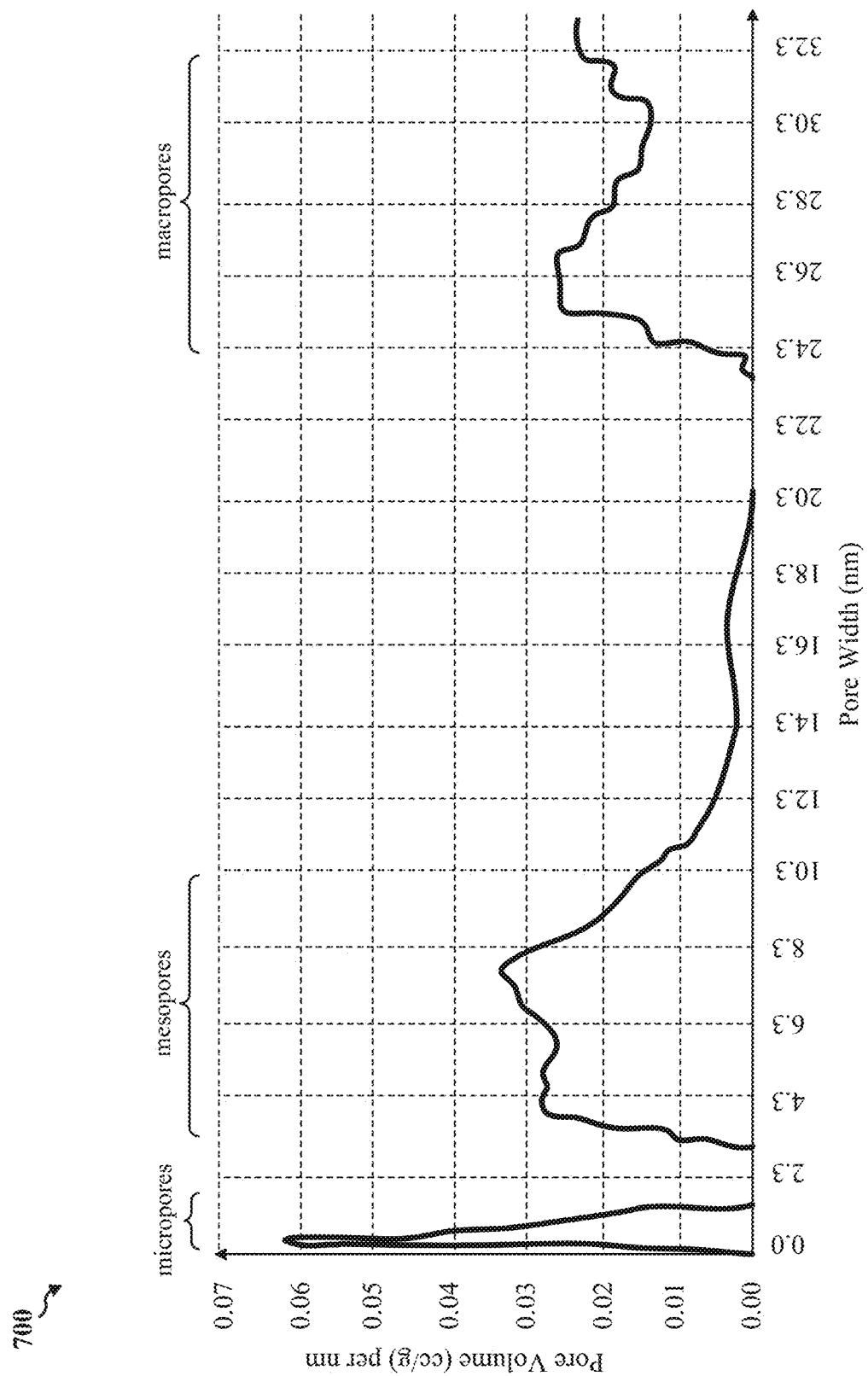
FIG. 7 shows a graph depicting an example distribution of pore volume versus pore width of an example carbonaceous particle, according to some implementations.

FIG. 7 shows a graph 700 depicting an example distribution of pore volume versus pore width of pores within graphenated nanosheets of the NHCS particles 226 of the cathode 110 of FIG. 2 or other carbonaceous materials described herein, according to some implementations. As depicted in the graph 700, pores associated with a relatively high pore volume may have a relatively low pore width, for example, such that the pore width generally increases as the pore volume decreases. In some aspects, pores having a pore width less than approximately 1.0 nm may be referred to as micropores, pores having a pore width between approximately 3 and 11 nm may be referred to as mesopores, and pores having a pore width greater than approximately 24 nm may be referred to as macropores.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above in combination with one another, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

What is claimed is:

1. A lithium-air battery in fluid communication with an ambient atmosphere, the lithium-air battery comprising:
    an anode configured to release a plurality of lithium (Li) ions;
    a cathode positioned opposite to the anode, the cathode including a plurality of pores, pathways, and cavities defined by one or more carbonaceous structures arranged in the cathode, where each carbonaceous structure is based on coalescence of a corresponding group of porous non-hollow carbonaceous spherical particles;
    an electrolyte dispersed throughout the cathode and in contact with the anode;
    a separator positioned between the anode and the cathode; and
    a protective layer disposed on the anode, the protective layer comprising:
        a polymeric network deposited over one or more exposed surfaces of the anode, the polymeric network including carbonaceous materials grafted with a plurality of fluorinated polymer chains cross-linked with each other, wherein the carbonaceous materials include one or more of graphene, few layer graphene, many layer graphene, graphene nanoparticles, or 3D graphene scaffolds; and
        a lithium fluoride (LiF) film formed from the polymeric network and lithium provided by the anode.

2. The lithium-air battery of claim 1, wherein the plurality of pathways includes:
    a network of interconnected transport pores configured to transport oxygen from the ambient atmosphere into the cathode;
    a network of interconnected transport pathways configured to diffuse the oxygen throughout the cathode;
    a network of interconnected storage pathways configured to remove chemical byproducts associated with operational cycling of the battery from the network of interconnected transport pathways; and
    a network of interconnected storage cavities configured to store or retain the removed chemical byproducts, wherein the network of interconnected transport pores, the network of interconnected transport pathways, the network of interconnected storage pathways, and the network of interconnected storage cavities are in fluid communication with each other.

3. The lithium-air battery of claim 2, wherein the network of interconnected storage pathways is configured to extract accumulations of the chemical byproduct from the network of interconnected transport pathways.

4. The lithium-air battery of claim 2, wherein at least some interconnected storage cavities have a diameter in an approximate range between 0.6 nanometers (nm) and 6.6 nm.

5. The lithium-air battery of claim 4, wherein a discharge capacity of the lithium-air battery is based at least in part on the diameter of a respective interconnected storage cavity.

6. The lithium-air battery of claim 5, wherein at least some interconnected transport pores include an opening to the ambient atmosphere.

7. The lithium-air battery of claim 6, wherein at least some of the interconnected storage cavities are configured to retain the reaction product within a specified distance from the opening of a respective transport pore.

8. The lithium-air battery of claim 1, further comprising an outer layer deposited on the lithium fluoride film.

9. The lithium-air battery of claim 8, wherein the outer layer includes one or more of a polymer or an epoxy encapsulated ionic conductor.

10. The lithium-air battery of claim 1, wherein the anode is a Li metal layer.

11. The lithium-air battery of claim 1, wherein each carbonaceous structure includes a three-dimensional (3D) graphenated structure formed from a stack of graphene nanosheets.

12. The lithium-air battery of claim 11, wherein each graphene nanosheet within the stack of graphene nanosheets has a principal dimension of less than 1 μm.

13. The lithium-air battery of claim 11, wherein at least one graphene nanosheet within the stack of graphene nanosheets includes a plurality of mesopores, each mesopore having a volume approximately greater than 1 cc/g.

14. The lithium-air battery of claim 1, wherein the cathode has a surface area in an approximate range between 5 $m^2/g$ and 3,000 $m^2/g$.

15. The lithium-air battery of claim 1, wherein the cathode includes graphene doped with one or more of nitrogen or sulfur.

16. The lithium-air battery of claim 1, wherein the cathode is treated with ozone ($O_3$).

17. The lithium-air battery of claim 1, wherein the cathode further comprises:
    a plurality of surfaces exposed to the ambient atmosphere; and
    a catalyst deposited on one or more of the plurality of surfaces.

18. The lithium-air battery of claim 1, wherein one or more of the plurality of pathways has a diameter approximately between 0.1 μm and 10 μm.

19. The lithium-air battery of claim 1, wherein the electrolyte includes an aprotic liquid-phase electrolyte solution.

* * * * *